(12) United States Patent  
Chillson et al.

(10) Patent No.: US 10,044,877 B1  
(45) Date of Patent: Aug. 7, 2018

(54) REVISED VOICE TRAFFIC CALL FLOW

(71) Applicant: Sprint Communications Company L.P., Overland Park, KS (US)

(72) Inventors: Thomas W. Chillson, Olathe, KS (US); Chad M. Andrews, Archie, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 185 days.

(21) Appl. No.: 15/151,202

(22) Filed: May 10, 2016

(51) Int. Cl.  
  *H04M 7/00* (2006.01)  
  *H04L 5/22* (2006.01)  
  *H04L 29/06* (2006.01)

(52) U.S. Cl.  
  CPC ............ *H04M 7/0075* (2013.01); *H04L 5/22* (2013.01); *H04L 65/1006* (2013.01); *H04L 65/605* (2013.01)

(58) Field of Classification Search  
  None  
  See application file for complete search history.

*Primary Examiner* — James P Duffy

(57) ABSTRACT

A method of voice communication between a mobile communication network and a local exchange carrier (LEC) network. The method comprising receiving, at a network switch, a voice call data stream in time-division multiplexing (TDM) format. The voice call data stream is addressed to a pseudo COMMON LANGUAGE (CLLI) identifier. The network switch is connected to a TDM trunk and a session initiation protocol (SIP) trunk. The network switch is associated with a vendor CLLI identifier and the pseudo CLLI identifier. The method comprises converting, by the network switch, at least a first portion of the voice call data stream into a SIP data stream and, transmitting, the SIP data stream to a session border controller of a mobile communication service provider, where the session border controller is configured to transmit the SIP data stream to an internal network switch associated with the pseudo CLLI identifier.

20 Claims, 7 Drawing Sheets

| SW_CLLI | SHA_IND | TRMTNG_FGD_TND | TRMTNG_LOCAL_TND | TRMTNG_INTRAL_TND | ACTL_SW_ID | CALL_AGENT |
|---|---|---|---|---|---|---|
| TOLDOHPG0MD | 00 | LEVEL 3 FGD CLLI | TOLDOH216GT | TOLDOH216GT | PHLAPAFGCM9 | AKRNOHIJCA2 |
| TOLDOHPG0MD | 01 | LEVEL 3 FGD CLLI | BWLGOHXA51T | BWLGOHXA51T | PHLAPAFGCM9 | AKRNOHIJCA2 |
| TOLDOHPG0MD | 03 | LEVEL 3 FGD CLLI | NRWLOHXA51T | NRWLOHXA51T | PHLAPAFGCM9 | AKRNOHIJCA2 |
| TOLDOHPG0MD | 04 | LEVEL 3 FGD CLLI | NPLNOHXAG0T | NPLNOHXAG0T | PHLAPAFGCM9 | AKRNOHIJCA2 |
| DTRTMIPMHMD | 00 | LEVEL 3 FGD CLLI | ADRNMIXG45T | ADRNMIXG45T | PHLAPAFGCM9 | AKRNOHIJCA2 |

| NPA | COX | NXX_BLK_ID | SW | SHA_CD |
|---|---|---|---|---|
| 419 | 206 | 3 | TOLDOHPG0MD | 00 |
| 419 | 206 | 4 | TOLDOHPG0MD | 00 |
| 419 | 213 | 0 | TOLDOHPG0MD | 00 |
| 419 | 213 | 9 | TOLDOHPG0MD | 00 |
| 419 | 215 | A | TOLDOHPG0MD | 00 |

FIG. 2

REVISED VOICE TRAFFIC CALL FLOW

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Phone calls involving voice data may traverse various networks including a local exchange carrier (LEC) network as well as mobile communication networks. As the voice data traverses the various networks, the data may be converted into various formats such as time-division multiplexing (TDM) trunking format or session initiation protocol (SIP) format. This is due in part to some mobile communication networks transitioning network equipment to support SIP formats, while LEC networks continue to maintain legacy infrastructure including switches and trunks that use TDM protocols. In some situations, a LEC network may charge other companies for use of the TDM resources, for instance for the service of terminating a voice call by way of a TDM trunk maintained by the LEC network.

SUMMARY

In an embodiment, a method of voice communication between a mobile communication network and a local exchange carrier (LEC) network is disclosed. The method comprises receiving, at a network switch, a voice call data stream in time-division multiplexing (TDM) format, where the voice call data stream is addressed to a pseudo COMMON LANGUAGE (CLLI) identifier. The network switch is connected to a TDM trunk and a session initiation protocol (SIP) trunk. The network switch is associated with a vendor CLLI identifier and a pseudo CLLI identifier. The method further comprises converting, by the network switch, at least a first portion of the voice call data stream into a SIP data stream and transmitting by way of the SIP trunk, the SIP data packet to a session border controller of a mobile communication service provider, where the session border controller is configured to transmit the SIP data stream to an internal network switch associated with the pseudo CLLI identifier.

In an embodiment, a telecommunication system is disclosed. The telecommunication system comprises a first interface device communicatively coupled to a local exchange carrier network by a time-division multiplexing (TDM) link. The telecommunication system further comprises a second interface device communicatively coupled to a mobile communication network by a session initiation protocol (SIP) link. The telecommunication system further comprises a memory, a processor, and a program stored in the memory that, when executed by the processor: receives, by way of the first interface device, a voice call data stream in time-division multiplexing (TDM) format, where the voice call data stream is from a local exchange carrier (LEC) network switch located in a LEC network. Furthermore the voice call data stream is addressed to a pseudo CLLI identifier. The program further converts at least a first portion of the voice call data stream into a SIP data stream and transmits, by way of the second interface device, the SIP data stream to a session border controller in a mobile communication network.

In an embodiment, a telecommunication system is disclosed. The telecommunication system comprises an interface device communicatively coupled to a vender network switch by way of a session initiation protocol (SIP) link. The telecommunication device further comprises a memory, a processor, and a program stored in the memory that, when executed by the processor updates a memory of the telecommunication system with a call agent CLLI identifier and receives, by way of the interface device, a voice call data stream in SIP format. An original voice call data stream is routed from a local exchange carrier in time-division multiplexing (TDM) format to a vendor switch associated with a pseudo CLLI identifier. The original voice call data stream is further transmitted from the vendor switch in SIP format.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2 is an illustration of database tables according to an embodiment of the disclosure.

DETAILED DESCRIPTION

Figure 1:
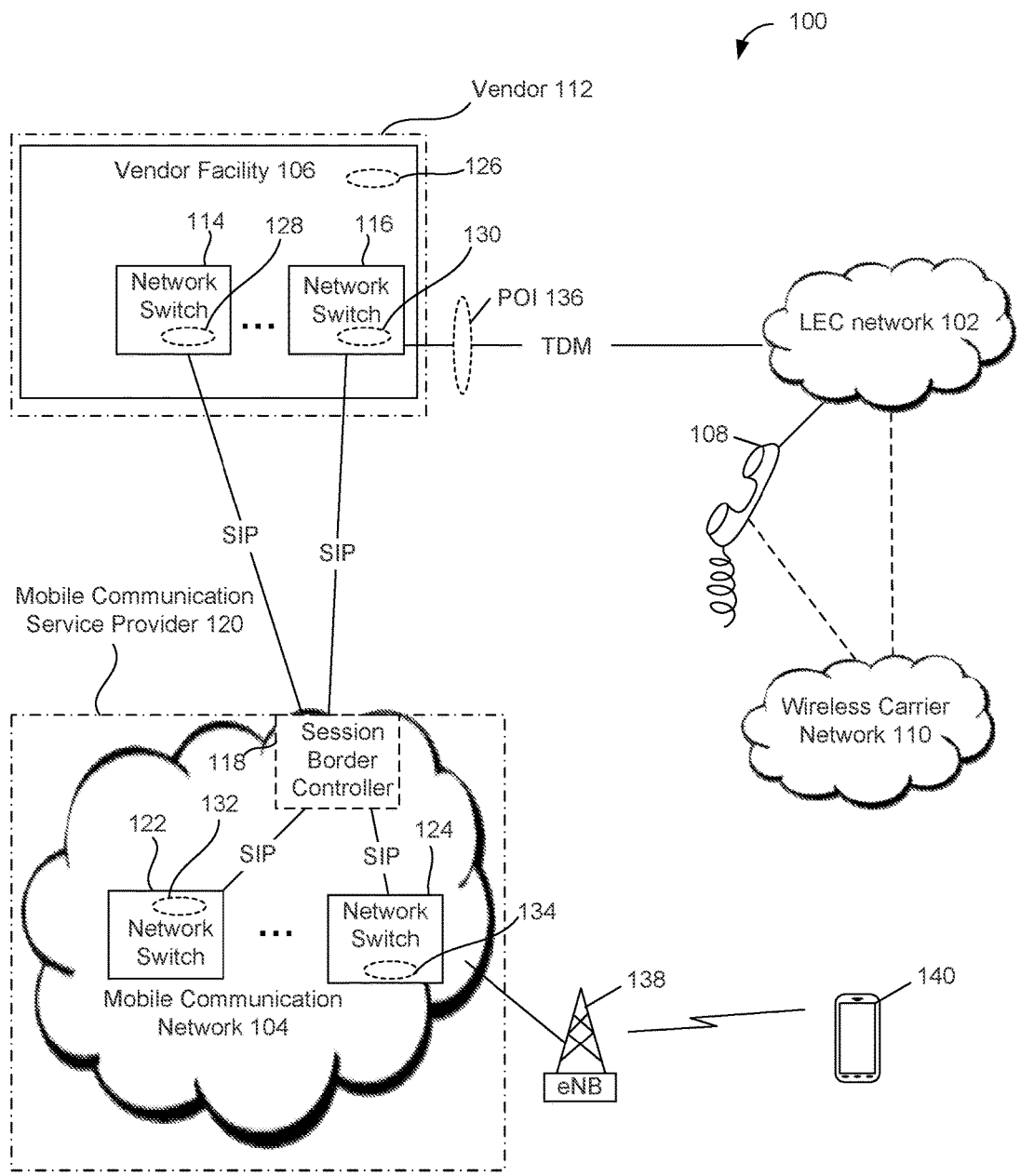
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mobile communication service providers migrate to infrastructures that support transfer of data in SIP format, a mobile communication service provider may face challenges when receiving calls originating from a network using a different protocol such as TDM, which is not compatible with SIP. In order to address such problems, a mobile communication service provider may choose to maintain TDM infrastructure and resources within the mobile communication network in order to transfer calls with a network using TDM protocols. As disclosed in the present disclosure, another solution to the problem entails working with a third party vendor which has agreed to receive calls in TDM format, on behalf of the mobile communication service provider. The third party vendor may convert a voice call received in TDM format to SIP format and subsequently hand the voice call over to the mobile communication network in SIP format. The third party vendor may handle both incoming and outgoing traffic between the two networks. An incoming call may be received from a LEC network, by the third party vendor, that is subsequently transferred to a mobile communication network. An outgoing call may be routed from the mobile communication network to the third party vendor, that is subsequently transferred to the LEC network.

Due to current agreements established between entities owning and operating telecommunication networks, such as an intercarrier agreement (e.g., the ICA), a mobile communication network may be obliged to maintain a trunking resource connected to a LEC. Thus, in a scenario where a mobile communication network transfers legacy TDM infrastructure and resources to a third party, it may be beneficial if the third party vendor agrees to transfer calls between the mobile communication network and the LEC, such that the mobile communication network maintains a trunking resource connected to the LEC. Thus, subsequent to the transferring of the trunking resources, calls between the mobile communication network and LEC may be routed through the third party vendor location using the transferred trunking resources.

In a scenario where a mobile communication network transfers legacy TDM infrastructure and resources to a third party vendor that agrees to maintain the TDM network on behalf of the mobile communication service provider, an ability to efficiently and transparently substitute switches without requiring changes on the routing of other parties (i.e., a LEC) may be beneficial. Subsequent to the substitution of the switches, the terms of the agreement are still met because the mobile communication network has a trunking resource (that is owned and operated by the third part vendor) connected to the LEC.

This solution is viable if the third party vendor authorizes a mobile communication service provider to create a pseudo common language location identifier ("CLLI") identifier at the third party vendor location, as taught by the present disclosure. The use of the pseudo CLLI identifier at the third party vendor location enables a mobile communication network to transfer TDM infrastructure to the third party vendor without requiring changes on the routing of other parties (i.e., a LEC). Thus, through the use of a pseudo CLLI identifier, calls may be routed through a third party vendor location between a mobile communication service provider and a LEC for example, without requiring changes in routing information that may be stored in routing tables of the LEC.

A LEC network may determine where to send a call by identifying a location of a CLLI identifier and sending to the call to the location of the CLLI identifier. A mobile communication service provider may have certain designated CLLI identifiers associated with the mobile communication service provider. For instance, a mobile communication service provider may file certain CLLI identifiers as owned by the mobile communication service provider. Thus, when a LEC network accepts an order for a trunking resource to connect to a certain CLLI identifier, the LEC network may determine the entity the LEC network is connecting to based on the CLLI identifier.

The present disclosure teaches a system and method of enabling a third party vendor to exchange calls between a mobile communication network and a LEC network, where the third party vendor does so on behalf of the mobile communication network, through the use of a pseudo CLLI identifier. For example, the third party vendor may authorize the mobile communication service provider to place a pseudo CLLI identifier on a vendor network switch owned and operated by the third party vendor. The vendor network switch is located in a facility owned and operated by the third party vendor. The pseudo CLLI identifier contains characters indicating an association with the mobile communication service provider. A mobile communication service provider may file the pseudo CLLI identifier as a new CLLI code owned by the mobile communication service provider. For example, the ending characters of the pseudo CLLI identifier may contain the characters "CM9" which subsequently identifies the pseudo CLLI identifier as belonging to the mobile communication service provider. The pseudo CLLI identifier, in turn, refers to and is associated with a physical switch located in a facility owned and operated by the mobile communication service provider. Thus, a call originating from the LEC may be routed based on the pseudo CLLI identifier to the mobile communication network via the third party.

The disclosed system and methods implement a pseudo CLLI at a vendor facility, where voice data in TDM format is initially routed. The voice data is converted to SIP format and transmitted to a network switch that is tied to the pseudo CLLI identifier but is physically located within the mobile communication network of a mobile communication service provider. Alternatively, the vendor facility may route calls (e.g., both incoming and outgoing) calls between the mobile communication service provider and the LEC. By authorizing the placement of a pseudo CLLI identifier which is associated with a mobile communication service provider, at a third party vendor switch, calls may be routed seamlessly between the mobile communication service provider and the LEC without requiring changes in routing tables used by the LEC.

Turning now to FIG. 1, a communication system 100 is described. In an embodiment, the system 100 comprises a LEC network 102, a mobile communication network 104, and a vendor facility 106. It is understood that LEC is a term for a telephone company in the United States that provides local services and does not typically include an entity engaged in the provision of commercial mobile services, such as a mobile communication service provider.

The LEC network 102 may provide landline telephone services in a local area in which the local exchange carrier operates. The LEC network 102 may be abstracted in different ways and may comprise various switches, wirelines, servers, and network nodes specifically associated with providing landline services to customers. Thus, a call received by LEC network 102 may terminate at landline 108. Alternatively, the LEC network 102 may hand the call off to wireless carrier network 110. LEC network 102 may receive calls from the wireless carrier network 110 as well as the mobile communication network 104. A LEC network may comprise any local exchange carrier network, e.g., a competitive local exchange carrier (CLEC) network, LECs owned by the Bell operating companies (BOCs), and regional Bell operating companies (RBOCs).

Wireless carrier network 110 and mobile communication network 104 may provide commercial mobile services and also service a plurality of mobile communication devices. Wireless carrier network 110 and mobile communication network 104 may be abstracted in different ways and may comprise enhanced node BS (eNBs) (which may also be referred to in some contexts as base transceiver stations or cell towers), servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to mobile communication devices.

LEC network 102 is connected to a vendor facility 106 by way of a TDM trunk. A trunk may comprise a line or link designed to handle many signals simultaneously, and may additionally connect major switching centers or nodes in a communications system. The transmitted data may comprise voice, as is the case in a TDM network, or data, computer programs, images, video, or control signals. The vendor facility 106 is owned and operated by vendor 112. Vendor 112 may be an entity separate from an entity operating the LEC network 102 and the wireless carrier network 110. Additionally, vendor 112 may be separate from the mobile communication service provider 120. In various embodiments, vendor 112 may maintain TDM resources and infrastructure in order to receive a voice call on behalf of mobile communication service provider 120 in TDM format. Although a single vendor facility 106 is depicted in FIG. 1, it is understood that vendor 112 may operate a plurality of vendor facilities such as vendor facility 106, where the vendor facilities are configured to receive voice calls in TDM format on behalf of mobile communication network 104.

Vendor facility 106 houses or is provisioned with a plurality of pseudo CLLI identifiers 126, 128, and 130. A vendor 112 may authorize the mobile communication service provider 120 to create a pseudo CLLI identifier at vendor facility 106. Vendor 112 may recreate a TDM network similar to a prior TDM network maintained by the mobile communication service provider 120. For example, vendor 112 may order a TDM trunk on behalf of mobile communication service provider 120, in which calls are routed through the pseudo CLLI identifier. In such a manner, a TDM network previously operated by mobile communication service provider 120 may be transferred to vendor 112.

In various embodiments, the pseudo CLLI identifiers 126, 128, and 130 mobile communication service provider 120 enable the vendor 112 to receive calls on behalf of mobile communication network 104. In one example, a call may originate from landline 108 and be directed to user equipment 140 connected to mobile communication network 104. The LEC network 102 may determine to transfer the call to a pseudo CLLI identifier 126, 128, or 130 associated with mobile communication network 104. Physically, the call will travel through vendor facility 106 before reaching the mobile communication network 104 which may then send the call to the user equipment 140. In this example, the call may originate in TDM format within the LEC network 102, be converted to SIP format within vendor facility 106 and transmitted in SIP format to the mobile communication service provider 120.

Pseudo CLLI identifier 126 may be anchored in any piece or pieces of hardware which is configured to receive a voice call from LEC network 102, convert the voice call to SIP format and transfer the call to a network switch (e.g., network switch 122 or 124), within mobile communication network 104 that the pseudo CLLI identifier 126 is associated with. As depicted, pseudo CLLI identifiers 128 and 130 may be located at the same location as respective network switches 114 or 116 within vendor facility 106 (e.g., be stored in a memory associated with one or more of the switches 114, 116). Each pseudo CLLI identifier located within vendor facility 106 refers to a respective network switch within the mobile communication network 104. For example, pseudo CLLI identifier 128 may refer to or be tied to network switch 122, while pseudo CLLI identifier 130 may refer to or be tied to network switch 124.

Vendor facility 106 comprises a plurality of network switches such as network switches 114 and 116. In addition to having a pseudo CLLI identifier that resides on top of a network switch 114 or 116, the network switches 114 and 116 may be associated with respective vendor CLLI identifiers that are different from the pseudo CLLI identifiers 128 and 130. Thus a network switch 114 or 116 may be associated both with a respective vendor CLLI identifier as well as a pseudo CLLI identifier. Pseudo CLLI identifiers 128 and 130 are different from other CLLI identifiers because unlike other CLLI identifiers, pseudo CLLI identifiers 128 and 130 are located in a physical location different from the network switches that the pseudo CLLI identifiers 128 and 130 refer to. For example, pseudo CLLI identifiers 128 and 130 are located within vendor facility 106 and the network switches to which the pseudo CLLI identifiers refer to are located within mobile communication network 104 (e.g., networks switches 122 and 124). In some embodiments, network switches 122 and 124 may be located in a facility operated by mobile communication service provider 120.

The presence of the pseudo CLLI identifiers 126, 128, and 130 results in a placement of a point of interconnection (POI) 136 for mobile communication network 104 at the vendor facility 106. Although a single POI 136 is depicted in FIG. 1, a plurality of POIs 136 may be located at vendor facility 106. Each POI 136 may be correlated to a specific set of pseudo CLLI identifiers 126, 128, and 130. In various embodiments, the POI 136 may represent an area presence of a mobile communication service provider 120 in a designated rate center. Continuing the example where a call originates from landline 108 and is directed to user equipment 140, the LEC network 102 may determine that the call should be routed through POI 136 to reach user equipment 140 connected to mobile communication network 104. The call directed to POI 136 may traverse vendor facility 106 through pseudo CLLI identifier 128 prior to reaching network switch 122 to which pseudo CLLI identifier 128 refers to.

Network switches 114 and 116 may be configured to receive a voice call in TDM format on behalf of mobile communication service provider 120, to convert a data stream received in TDM format to SIP format, and transmit the converted data stream to a network switch 122 or 124 in mobile communication network 104. In some embodiments, the network switches 114 and 116 may be part of a switching system configured to convert the data stream received in TDM format to SIP format. Mobile communication network 104 may be owned and operated by mobile communication service provider 120. In various embodiments, the vendor facility 106 is connected to mobile communication network 104 by way of SIP trunks. As depicted in FIG. 1, and discussed previously, mobile communication network 104 comprises various switches such as network switches 122 and 124.

Mobile communication network 104 also comprises a plurality of session border controllers, such as session border controller 118. Through the SIP trunks, vendor facility 106 and mobile communication service provider 120 may exchange voice call data. In some embodiments, session border controller 118 or mobile communication network 104 may communicate with network switches 114 and 116 in vendor facility 106. In other embodiments, session border controller 118 in mobile communication network 104 may communicate with a session border controller of vendor 112.

The session border controller 118 may comprise a device that exerts control over the signaling as well media streams involved in setting up, conducting, and tearing down a voice call or other interactive media communications. Furthermore, a session may refer to a communication between two parties, such as a voice call. Each call in the SIP format may consist of one or more call signaling message exchanges that control the call, and one or more call data streams that carry the call's audio, or other data along with information of call statistics and quality. Together, these streams may comprise a session. Thus, the session border controller may exert influence over the data flows of sessions.

As depicted, the session border controller 118 is located at a border of the mobile communication network 104. Continuing the previous example where a call originates from landline 108 and is directed to user equipment 140, a data stream associated with the call may be transferred from pseudo CLLI identifier 128 and network switch 114 to session border controller 118. In this example, the session border controller 118 may determine that network switch 122 is a destination for the session, based on the call being addressed to pseudo CLLI identifier 128. In some embodiments, network switches 122 and 124 may be identified based on respective call agent identifiers 132 and 134. That is, the session border controller 118 may route the call to network switch 122 based on an association of call agent 132 to network switch 122.

The network switch 122 may transmit the call to user equipment 140 by way of eNB 138. The eNB 138 may be an Evolved Node B (eNB), which is an element in a Long-Term Evolution (LTE) network and communicates wirelessly with user equipment 140, similar to a base transceiver station (BTS) in GSM networks. Although an eNB is depicted, is it understood that eNB 138 may be any transceiver utilized by the mobile communication service provider 120 to communicate directly with user equipment 140. The eNB 138 may communicate with user equipment 140 using any of a variety of wireless communication protocols including a code division multiple access (CDMA) wireless communication protocol, an LTE wireless communication protocol, a global system for mobile communications (GSM) wireless communication protocol, a world-wide interoperability for microwave access (WiMAX) wireless communication protocol, or another wireless communication protocol.

User equipment 140 may comprise a radio transceiver to receive the call from eNB 138 and further may be a mobile communication device such as a smart phone, a cellular phone, a laptop, a tablet, etc. It is understood, that mobile communication network 104 may comprise any number of user equipment 140 and any number of eNBs 138. The collectivity of eNB 138 may be said to comprise a radio access network, in that these eNBs 138 may provide radio communication links to the user equipment 140 to provide access to the mobile communication network 104.

Accordingly, a communication system 100 is disclosed in which a vendor 112 operates a vendor facility 106 configured to receive a call on behalf of mobile communication network 104 from LEC network 102. Through the use of the pseudo CLLI identifiers 126, 128, and 130 present at the vendor facility 106, the mobile communication service provider 120 is able to maintain an area presence in a designated rate center. The vendor 112 may maintain and operate TDM infrastructure and resources so that vendor 112 may receive a voice call from LEC network 102 in TDM format and convert the call to SIP format before handing the call off to mobile communication network 104.

Turning now to FIG. 2, database tables according to an embodiment of the disclosure are disclosed. In database table 202, a portion of a LERG 7 SHA (switch homing arrangement) table is shown. Database table 202 may be part of a comprehensive routing database available from a routing administration. The database table 202 may be used for routing calls by service providers (e.g., mobile communication service provider 120, wireless carrier network 110 and LEC network 102). Service providers may include wireless, wireline, inter, and intra exchange, etc. Data in the database table 202 includes entries in columns 204, 206, 208, 210, 212, 214, and 216. In some embodiments, column 204 may include switch CLLI identifier information or NXX POI information.

That is, in some embodiments, the entry in 204 may reference NXX POI information instead of a physical switch. The NXX POI information may be the POI 136 as discussed in FIG. 1. For example, the NXX POI "TOLDOHPG0MD," may refer to POI 136. Entry 206 may include a homing arrangement indicator. Columns 208, 210, and 212 may indicate access tandems or the switch from which a call is coming from. Columns 214 and 216 correlate a pseudo CLLI identifier 126, 128, and 130 to network switches within mobile communication network 104. Entries in column 214 represent the pseudo CLLI identifiers 126, 128, and 130. Entries in column 216 are used internal to mobile communication network 104 and represent the call agents 132 and 134.

In an example, using the first entries in each column a call might be made to a phone number with the area code 419 and begin with 206 (i.e., NPA NXX) followed by another set of four numbers. The call might originate from LEC network 102 and thus may come through "TOLDOH216GT" as indicated in column 210. LEC network 102 may determine that the call is destined for NXX POI "TOLDOHPG0MD" based on the destination phone number. Such a determination may be made based on information contained in database table 218, which in some embodiments, represents a LERG 6 table. For example as indicated by table 218, the number 419-206-xxxx is routed to NXX POI "TOLDOHPG0MD" and SHA "00".

The call may be routed by LEC network 102 to pseudo CLLI identifier "PHLAPAFGCM9." According to some embodiments, the LEC network 102 is not aware that this is a pseudo CLLI identifier as the pseudo CLLI identifier contains the same characters as other CLLI identifiers. In particular, the characters at the end of the pseudo CLLI identifier "CM9" may be associated with mobile communication network 104. As discussed previously, a third party vendor, such as vendor 112, may authorize mobile communication service provider 120 to create a pseudo CLLI identifier at vendor facility 106.

In one example, by routing the call to pseudo CLLI identifier "PHLAPAFGCM9" the LEC network 102 transfers the call to a network switch 116 that has pseudo CLLI identifier 128 or "PHLAPAFGCM9" residing or provisioned on the network switch 116. Network switch 116 receives this call in TDM format, converts it to SIP format and transmits the call to session border controller 118. In some embodiments, the network switch 116 may be part of a switching system that converts the call from TDM format to SIP format.

In turn, session border controller 118 may determine that the call should be routed to network switch 124 based on the presence of call agent 134 on the network switch 124. That is, the session border controller 118 may determine that it has received a call directed to "PHLAPAFGCM9" and based on the correlation of "PHLAPAFGCM9" with the entry in column 216 of "AKRNOHIJCA2," the session border controller 118 may determine how to route the call within the mobile communication service provider 120. As depicted in FIG. 1, "AKRNOHIJCA2" is shown as call agent 134 on network switch 124. In various embodiments, the data entries in column 216 referencing call agents, may be used internal to mobile communication network 104 such that a session border controller 118 may transmit a call to the appropriate network switch internal to the mobile communication network 104.

Figure 3:
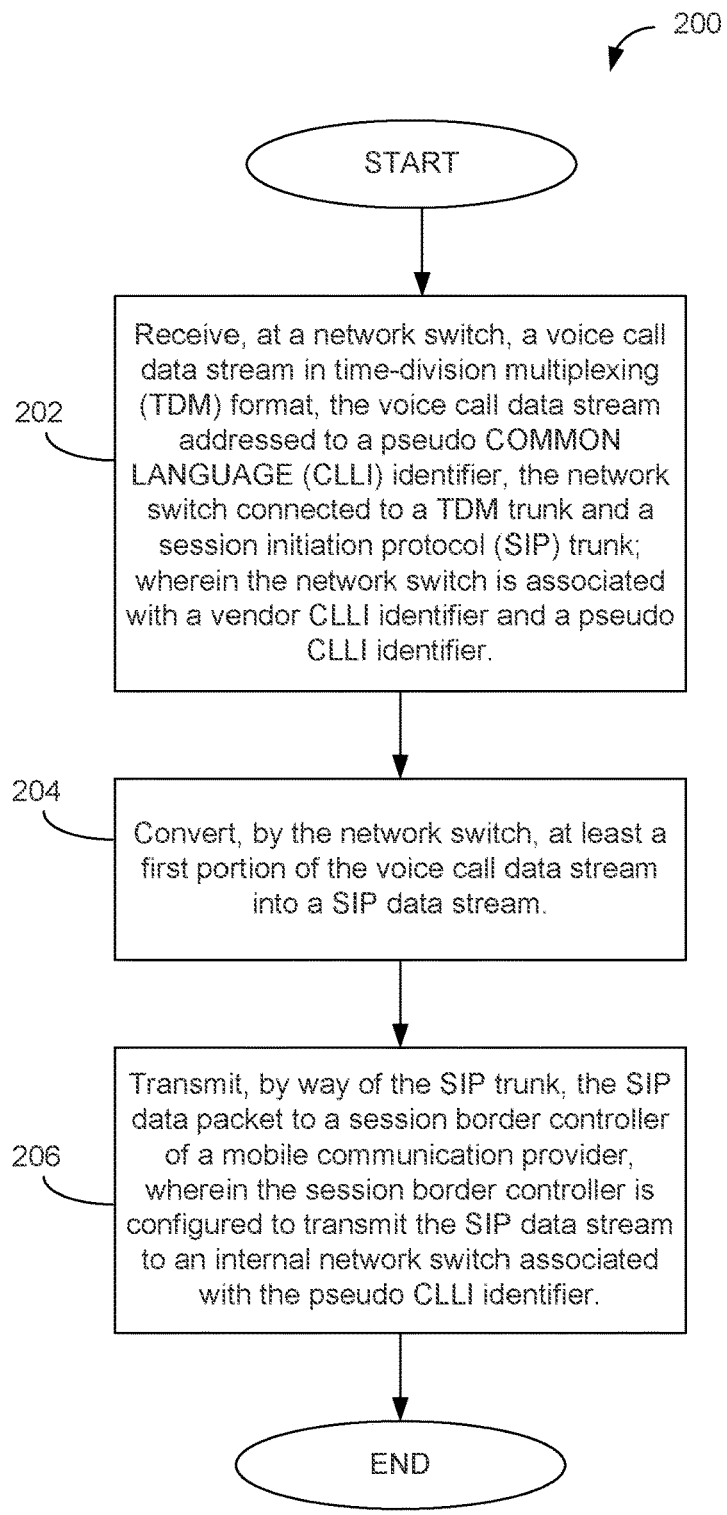
FIG. 3 is a flow chart illustrating a method according to an embodiment of the disclosure.

Turning now to FIG. 3, a method 200 is described. The method receives a call at the vendor facility and transmits it to a mobile communication network 104. In various embodiments, some of the blocks shown in FIG. 3 may be performed concurrently, in a different order than shown, or omitted. Additional method elements may be performed as desired.

At block 202, a voice call data stream in time-division multiplexing (TDM) format is received at a network switch. For example, this call may be received at network switch 116 located within vendor facility 106. The voice call data stream may be addressed to a pseudo CLLI identifier, for example, pseudo CLLI identifier 128. The network switch is connected to a TDM trunk and a session initiation protocol (SIP) trunk. As discussed previously, vendor 112 may authorize mobile communication service provider 120 to create a pseudo-CLLI at the vendor facility 106 and a TDM trunk may be ordered by vendor 112 on behalf of a mobile communication service provider 120. Furthermore, the network switch at the vendor facility is associated with a vendor CLLI identifier and the pseudo CLLI identifier.

At block 204, at least a first portion of the voice call data stream is converted into a SIP data stream by the network switch. And at block 206, the SIP data stream is transmitted, by way of the SIP trunk to a session border controller of a mobile communication network, for example session border controller 118. The session border controller is further configured to transmit the SIP data stream to an internal network switch associated with the pseudo CLLI identifier.

Figure 4:
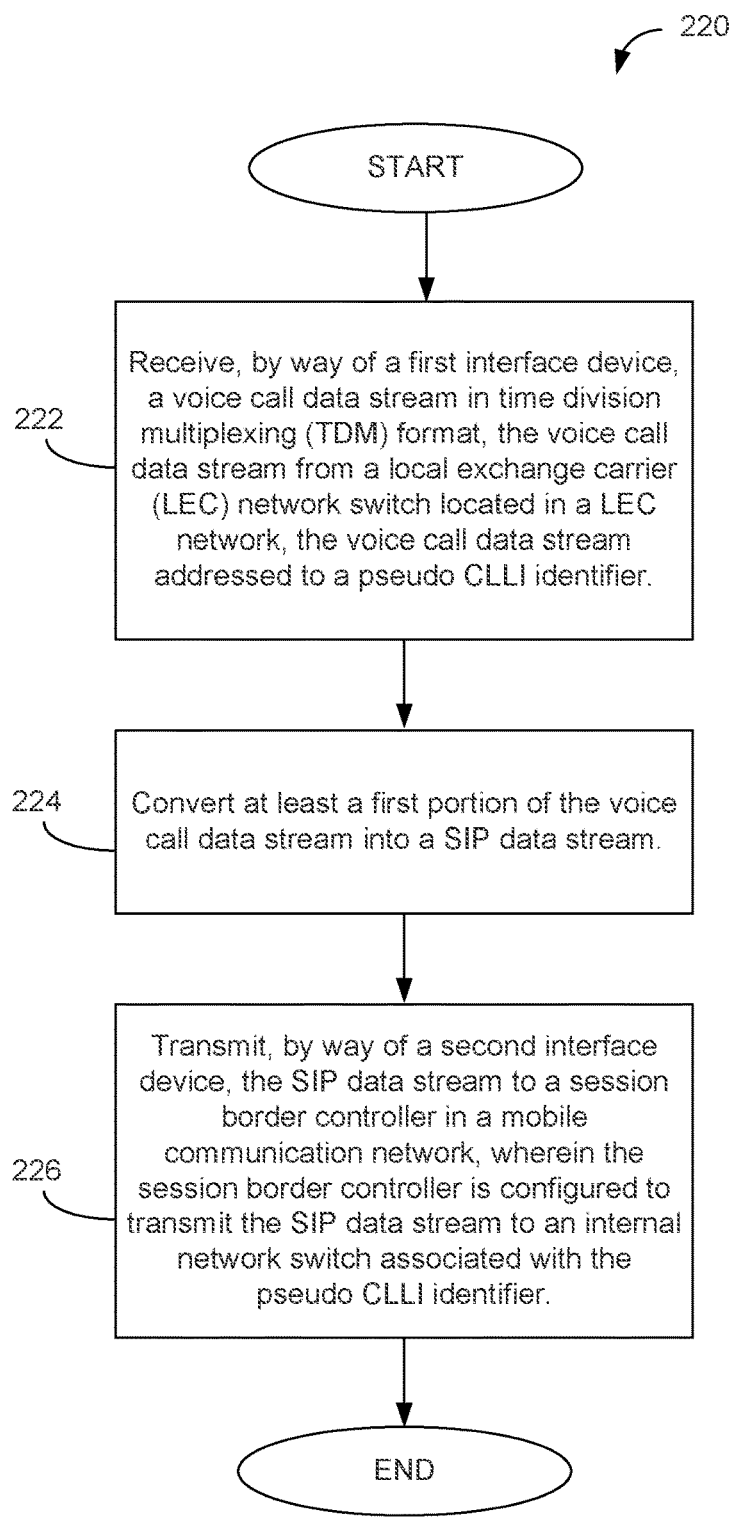
FIG. 4 is a flow chart illustrating another method according to an embodiment of the disclosure.

Turning now to FIG. 4, a method 220 is described in which a telecommunication system receives a call at the vendor facility and transmits it to a mobile communication network 104. In various embodiments, some of the blocks shown in FIG. 4 may be performed concurrently, in a different order than shown, or omitted. Additional method elements may be performed as desired.

At block 222 a voice call data stream in time-division multiplexing format (TDM) is received by way of a first interface device on vendor switch. The voice call data stream is from a local exchange carrier (LEC) network switch located in a LEC network. The voice call data stream is addressed to a pseudo CLLI identifier. At block 224, at least a first portion of the voice call data stream is converted into a SIP data stream. And at block 226, the SIP data stream is transmitted by way of a second model to a session border controller in a mobile communication network where the session border controller is configured to transmit the SIP data stream to an internal network switch associated with the pseudo CLLI identifier.

Figure 5:
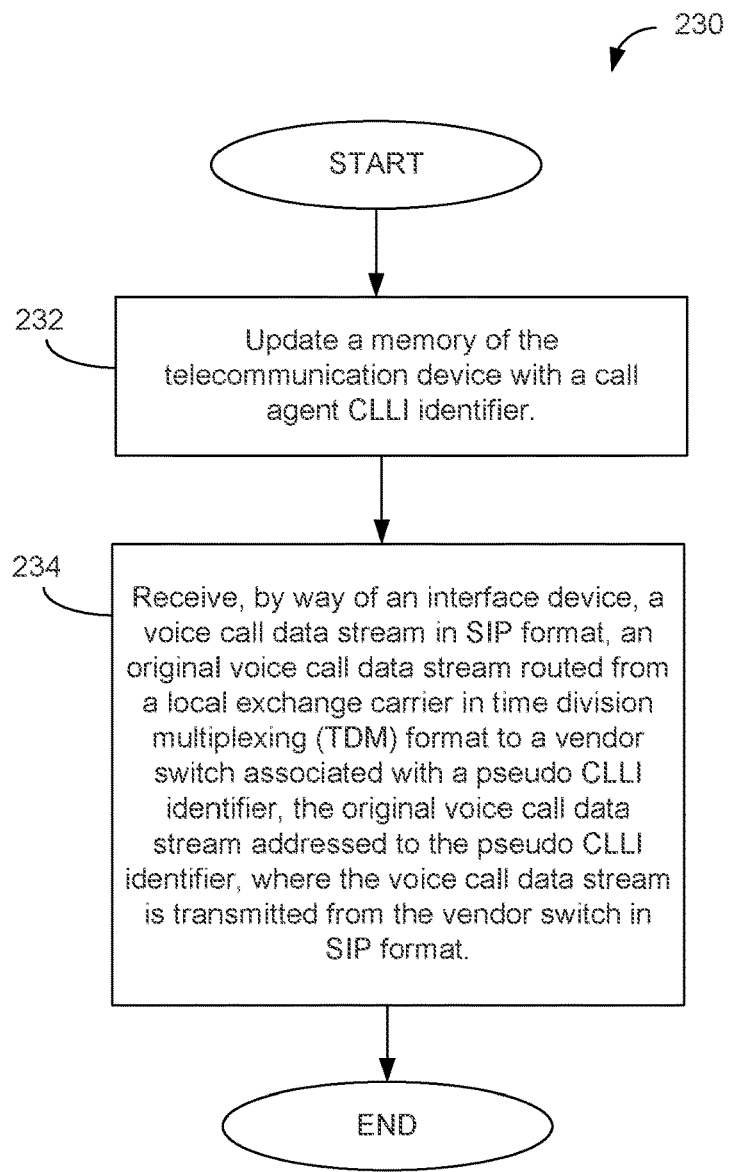
FIG. 5 is a flow chart illustrating another method according to an embodiment of the disclosure.

Turning now to FIG. 5, a method 230 is described in which a telecommunication system receives a SIP data stream addressed to a pseudo CLLI identifier. In various embodiments, some of the blocks shown in FIG. 5 may be performed concurrently, in a different order than shown, or omitted. Additional method elements may be performed as desired. Additional method elements may be performed as desired.

At block 232, an update may be performed to a memory of the telecommunication device with a call agent CLLI identifier. For example, the telecommunication device may be a network switch 122 or 124 in mobile communication network 104. In some embodiments, the memory in network switch 122 or 124 may be updated with a call agent CLLI identifier 132 or 134.

At block 234, a voice call data stream in SIP format may be received by way of an interface device. The voice call data stream is routed from a local exchange carrier such as LEC network 102 in time-division multiplexing (TDM) format to a vendor switch such as network switch 114 or 116. The vendor switch is associated with a pseudo CLLI identifier, such as pseudo CLLI identifiers 128 or 130. The voice call data stream is further transmitted from the vendor switch in SIP format.

Figure 6:
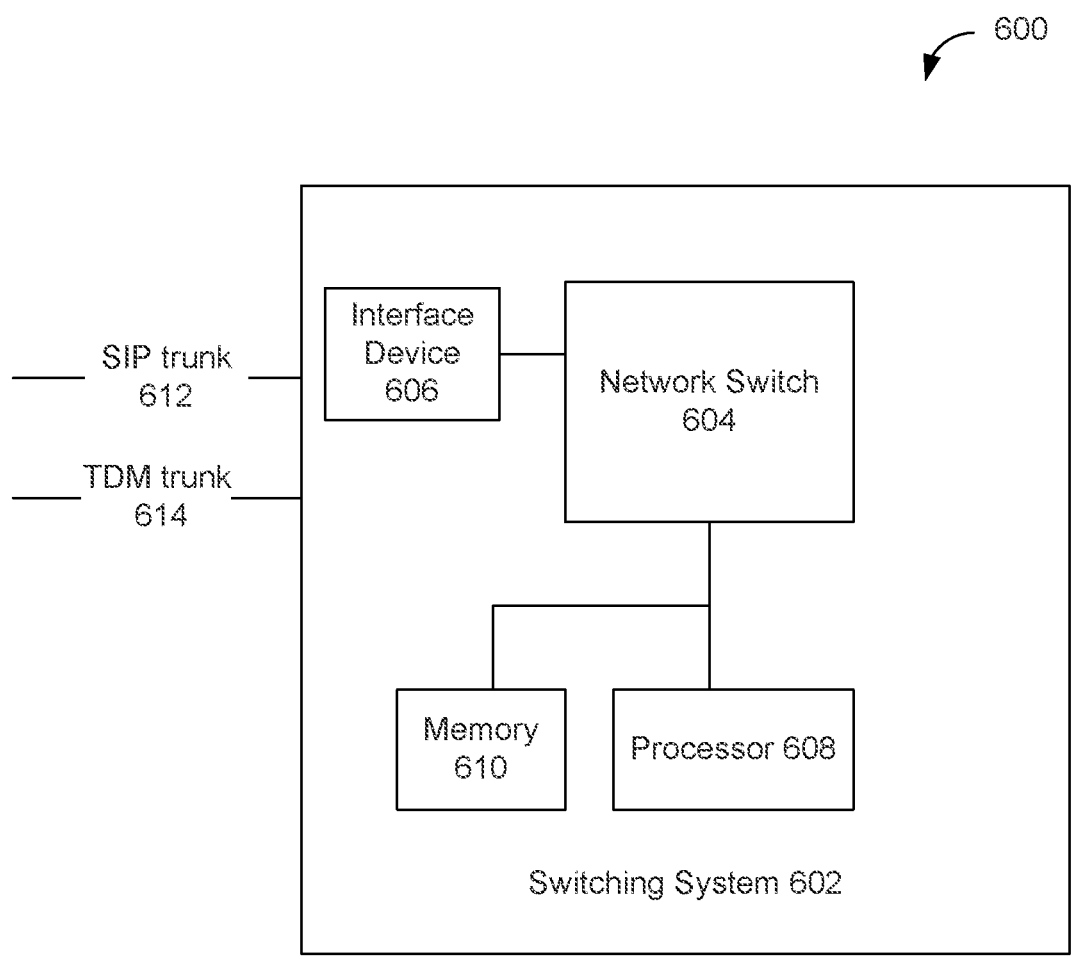
FIG. 6 is a block diagram of hardware architecture of a telecommunication system according to an embodiment of the disclosure.

Turning now to FIG. 6, a block diagram 600 of hardware architecture of a telecommunication system, such as switching system 602, according to an embodiment of the disclosure is described. While a variety of known components of a telecommunications system are depicted, in an embodiment, a subset of the listed components and/or additional components not listed may be included in the switching system 602. The switching system 602 includes a network switch 604, an interface device 606, processor 608, and memory 610. As shown, the switching system 602 may be coupled to SIP trunk 612 and TDM trunk 614. The SIP trunk 612 may couple the switching system 602 to mobile communication network 104, while TDM trunk 614 may couple the switching system 602 to LEC network 102.

Processor 608 or some other form of controller or central processing unit operates to control the various components of the switching system 602 in accordance with embedded software or firmware stored in memory 610 or stored in memory contained within the processor 608 itself. In addition to the embedded software or firmware, the processor 608 may execute other applications stored in the memory 610 or made available via information carrier media such as portable data storage media, like a removable memory card, or via wired or wireless network communications. The application software may comprise a compiled set of machine-readable instructions that configure the processor 608 to provide the desired functionality, or the application software may be high-level software instructions to be processed by an interpreter or compiler to indirectly configure the processor 602.

Programs executable by the processor 608 may be stored on memory 610, which may be for example, a hard drive, solid state disk, memory stick, optical disc, etc. Memory 610 may be accessed when needed when needed by the processor 608. Programs stored on memory 610 may comprise programs to implement various processes on the switching system 602, including methods steps in accordance with methods 200, 220, and 230.

Network switch 604 may comprise a telephone switch that uses digital electronics and computerized control to interconnect telephone circuits for the purpose of establishing telephone calls. Interface device 606 may receive signals from TDM trunk 614 and transmits the received signals after demodulating the signal to network switch 604. Conversely the interface device 606 may receive a signal from network switch 604 that is ready to be transmitted via TDM trunk 614. This might occur in a case when a case originates from mobile communication network 104 and terminates at a landline connected to LEC network 102. In various embodiments, an interface device 606 may comprise a modem.

Although one interface device 606 is depicted, a plurality of interface devices may be present within switching system 602 configured to handle signals of different protocols such as TDM and SIP. Accordingly, interface device 606 or a different interface device within switching system 602 may receive a signal from SIP trunk 612, and transmit the signal to network switch 604. Additionally, the interface device 606 may transmit a signal from network switch 604 to SIP trunk 612. This may occur, for example, when a call originating within the LEC network 102 terminates at user equipment 140 connected to mobile communication network 104.

Figure 7:
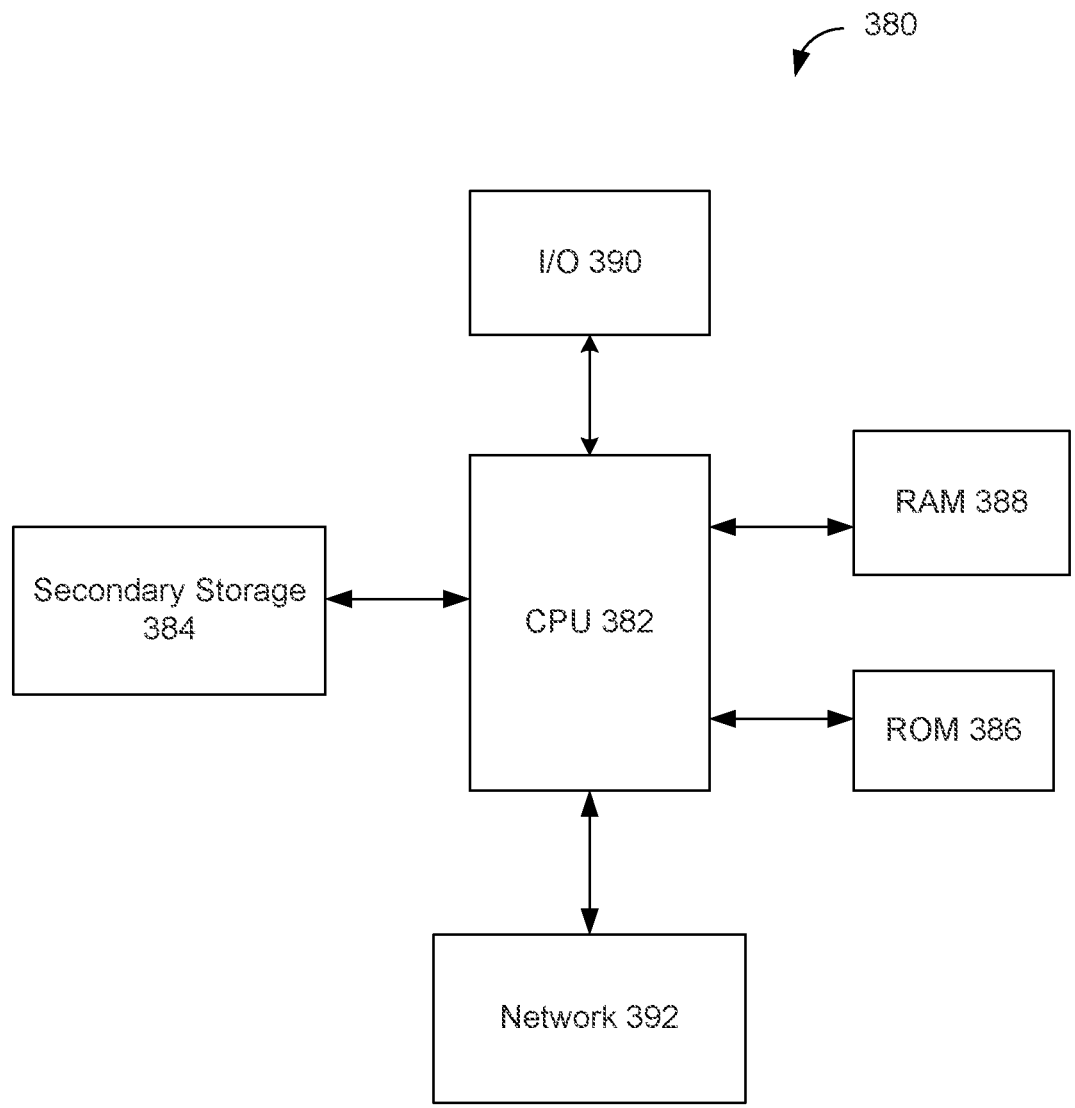
FIG. 7 is a block diagram illustrating an exemplary computer system suitable for implementing various aspects of an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embedded in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of voice communication between a mobile communication network and a local exchange carrier (LEC) network comprising:
   receiving, at a network switch, a voice call data stream in time-division multiplexing (TDM) format, the voice call data stream addressed to a pseudo COMMON LANGUAGE (CLLI) identifier, the network switch connected to a TDM trunk and a session initiation protocol (SIP) trunk;
wherein the network switch is associated with a vendor CLLI identifier and the pseudo CLLI identifier;
converting, by the network switch, at least a first portion of the voice call data stream into a SIP data stream; and
transmitting, by way of the SIP trunk, the SIP data stream to a session border controller of a mobile communication service provider, wherein the session border controller is configured to transmit the SIP data stream to an internal network switch associated with the pseudo CLLI identifier.

2. The method of claim 1,
wherein receiving the voice call data stream addressed to the pseudo CLLI identifier further comprises, receiving the voice call data stream at a vendor facility;
wherein the network switch is located in the vendor facility; and
wherein the pseudo CLLI identifier corresponds to the internal network switch located in a facility operated by the mobile communication service provider.

3. The method of claim 2, further comprising:
creating a pseudo CLLI identifier, by a vendor operating the vendor facility, wherein the pseudo CLLI identifier corresponds to the mobile communication service provider; and
updating the network switch with the pseudo CLLI identifier.

4. The method of claim 1, further comprising:
updating the internal network switch with a call agent CLLI identifier; and
updating a LERG 7 table in a routing database to associate the call agent CLLI identifier with the pseudo CLLI identifier; and
building a routing table from the LERG 7 table, such that the internal network switch is associated with both the pseudo CLLI identifier and the call agent CLLI identifier.

5. The method of claim 1,
wherein the network switch is operated by a vendor operating a vendor facility;
wherein, the network switch is connected to a local exchange carrier switch through the TDM trunk; and
wherein the network switch is connected to the internal network switch through the session border controller.

6. The method of claim 1, further comprising:
receiving, by way of the SIP trunk and at the network switch, a SIP voice call data stream in SIP format, the SIP voice call data stream from the internal network switch;
converting, by the network switch, at least a portion of the SIP voice call data stream into a TDM data stream, the TDM data stream in TDM format; and
transmitting, by way of the TDM trunk, the TDM data stream to the LEC network.

7. A telecommunication system, comprising:
a first interface device communicatively coupled to a local exchange carrier network by a time-division multiplexing (TDM) link,
a second interface device communicatively coupled to a mobile communication network by a session initiation protocol (SIP) link;
a memory;
a processor; and
a program stored in the memory that, when executed by the processor:
receives, by way of the first interface device, a voice call data stream in time-division multiplexing (TDM) format, the voice call data stream from a local exchange carrier (LEC) network switch located in the LEC network, the voice call data stream addressed to a pseudo CLLI identifier;
converts at least a first portion of the voice call data stream into a SIP data stream; and;
transmits, by way of the second interface device, the SIP data stream to a session border controller in a mobile communication network.

8. The telecommunication system of claim 7, wherein the program when executed by the processor further:
receives, by way of the second interface device and from the session border controller, a SIP voice call data stream destined for the LEC network;
converts at least a first portion of the SIP voice call data stream destined for the LEC network into a TDM data stream for the LEC network, the TDM data stream for the LEC network in TDM format; and
transmits, by way of the first interface device, the TDM data stream to the LEC network.

9. The telecommunication system of claim 7,
wherein the telecommunication system comprises a network switch associated with a vendor CLLI identifier and the pseudo CLLI identifier; and further
wherein the pseudo CLLI identifier ends in characters associated with a mobile communication service provider operating the mobile communication network.

10. The telecommunication system of claim 9, wherein the pseudo CLLI identifier is created by a vendor different from the mobile communication service provider.

11. The telecommunication system of claim 9, wherein the network switch is located in a vendor facility different from a facility operated by the mobile communication service provider.

12. The telecommunication system of claim 7, wherein the program when executed by the processor further:
determines that the voice call data stream is addressed to the pseudo CLLI identifier; and
based on the determination, converts the voice call data stream into the SIP data stream.

13. The telecommunication system of claim 7, further:
located in a vendor location, operated by a vendor;
wherein the telecommunication system is communicatively coupled to an internal network switch by way of the SIP link and a session border controller, the internal network switch located in the mobile communication network; and
wherein the internal network switch receives the SIP data stream, based on the voice call data stream addressed to the pseudo CLLI identifier.

14. The telecommunication system of claim 13,
wherein the internal network switch is associated with the pseudo CLLI identifier by way of an association of the pseudo CLLI identifier with a call agent CLLI identifier, the call agent CLLI identifier associated with the internal network switch; and
wherein the association of the pseudo CLLI identifier with the call agent CLLI is defined in a LERG 7 table in a routing database.

15. A telecommunication system, comprising:
an interface device communicatively coupled to a vendor switch by way of a session initiation protocol (SIP) link;
a memory;
a processor; and a program stored in the memory that, when executed by the processor:
  updates a memory of the telecommunication system with a call agent CLLI identifier; and
  receives from the vendor switch, by way of the interface device, a voice call data stream in SIP format, wherein the vendor switch converted the voice call data stream to SIP format from an original voice call data stream routed from a local exchange carrier in time-division multiplexing (TDM) format to the vendor switch associated with a pseudo CLLI identifier, the original voice call data stream addressed to the pseudo CLLI identifier,
wherein the voice call data stream is transmitted from the vendor switch in SIP format.

16. The telecommunication system of claim 15, wherein the interface device is further communicatively coupled to a session border controller coupling the telecommunication system to the vendor network switch.

17. The telecommunication system of claim 15,
  wherein the vendor switch is located at a vendor facility;
  wherein the telecommunication system comprises a network switch located in a mobile communication service provider facility; and
  further wherein the pseudo CLLI identifier is associated with a mobile communication service provider operating the mobile communication service provider facility.

18. The telecommunication system of claim 15, wherein the program updating the memory of the telecommunication system with the call agent CLLI identifier further comprises:
  updates based on a LERG 7 table in a routing database, the LERG 7 table associates a call agent CLLI identifier with the pseudo CLLI identifier; and
  wherein a mobile communication service provider builds a routing table from the LERG 7 table, such that an internal network switch is associated with both the pseudo CLLI identifier and the call agent CLLI identifier.

19. The telecommunication system of claim 15, wherein the pseudo CLLI identifier is associated with a call agent CLLI identifier in a LERG 7 table in a routing database updated by a mobile communication service provider operating the telecommunication system and wherein a session border controller located in a network of the mobile communication service provider routes the voice call data stream in SIP format to the telecommunication system, based on the original voice call data stream addressed to the pseudo CLLI identifier.

20. The telecommunication system of claim 15, wherein the program when executed by the processor further:
  transmits a SIP voice call data stream addressed to a local exchange carrier;
  wherein the SIP voice call data stream addressed to the local exchange carrier is routed through a session border controller in SIP format to the vendor switch, the SIP voice call data stream is converted to TDM format and transmitted to the local exchange carrier.

* * * * *